United States Patent [19]

Gaylord

[11] 4,051,743
[45] Oct. 4, 1977

[54] BOX WEBBING ADJUSTER

[75] Inventor: John A. Gaylord, San Diego, Calif.

[73] Assignee: H. Koch & Sons, Inc., Anaheim, Calif.

[21] Appl. No.: 695,077

[22] Filed: June 11, 1976

[51] Int. Cl.² ............... F16H 7/08; F16G 11/00; A44B 11/12
[52] U.S. Cl. .............. 74/242.8; 24/134 KB; 24/134 R; 24/170; 24/193
[58] Field of Search .......... 74/242.8; 24/68 CD, 24/68 SB, 69 SB, 69 SK, 69 R, 69 ST, 193 CL, 170X 134 KB, 134 QA, 74 R; 244/122 B

[56] References Cited
U.S. PATENT DOCUMENTS

| 2,226,393 | 12/1940 | Seeger et al. | 24/134 QA |
| 3,099,055 | 7/1967 | Huber | 24/68 CD |
| 3,289,261 | 12/1966 | Davis | 24/193 |

Primary Examiner—Leonard H. Gerin
Attorney, Agent, or Firm—George B. White

[57] ABSTRACT

In a box, open at least at one end, is a drum cam, into each end of which is secured a stub shaft from the hub of a hand lever; the hub of a hand lever; the hubs being journaled in opposite side walls of the box; the hand levers being outside the box for turning the cam manually to release the webbing; cross-sectionally the cam is a substantially diagonal cam, the opposite projections or apices of which are rounded and spaced apart to a distance equal to or greater than the height of the box; smooth gripping surfaces adjacent the respective projections are diagonally spaced apart to leave a clearance less than the thickness of the webbing to be clamping against the top and bottom of the box when tension on the webbing around the cam urges the projections toward said top and bottom; a light multiple ribbon spring between an end wall of the box and the cam urges the webbing against the surface of the cam with light pressure; a pin spaced from the cam anchors the end of the webbing, so that the webbing extends from said anchor pin to be connected to parts to be held together and then around the cam in the box out to form a tab.

6 Claims, 7 Drawing Figures

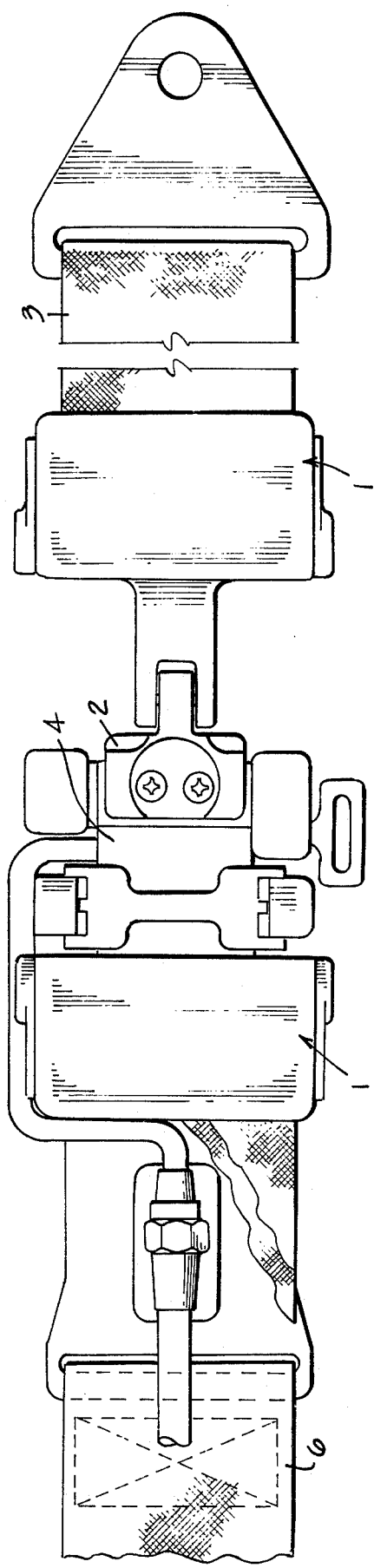
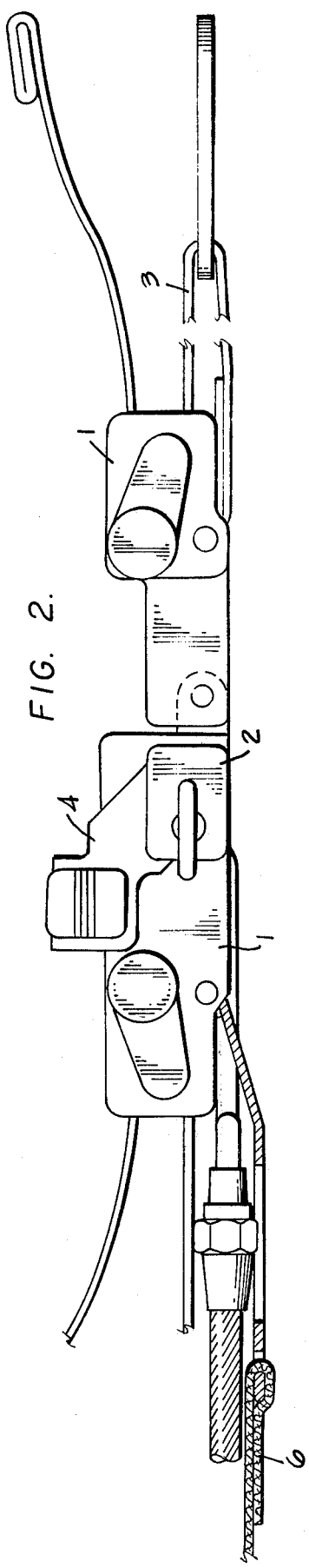
FIG. 1.
FIG. 2.

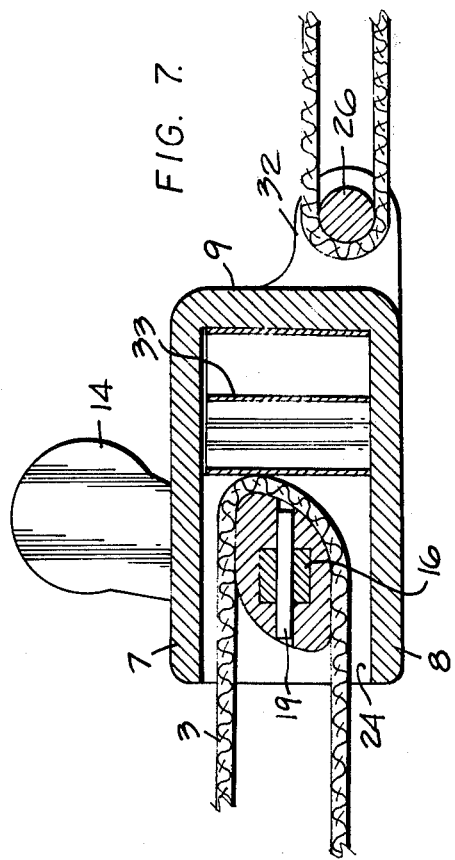
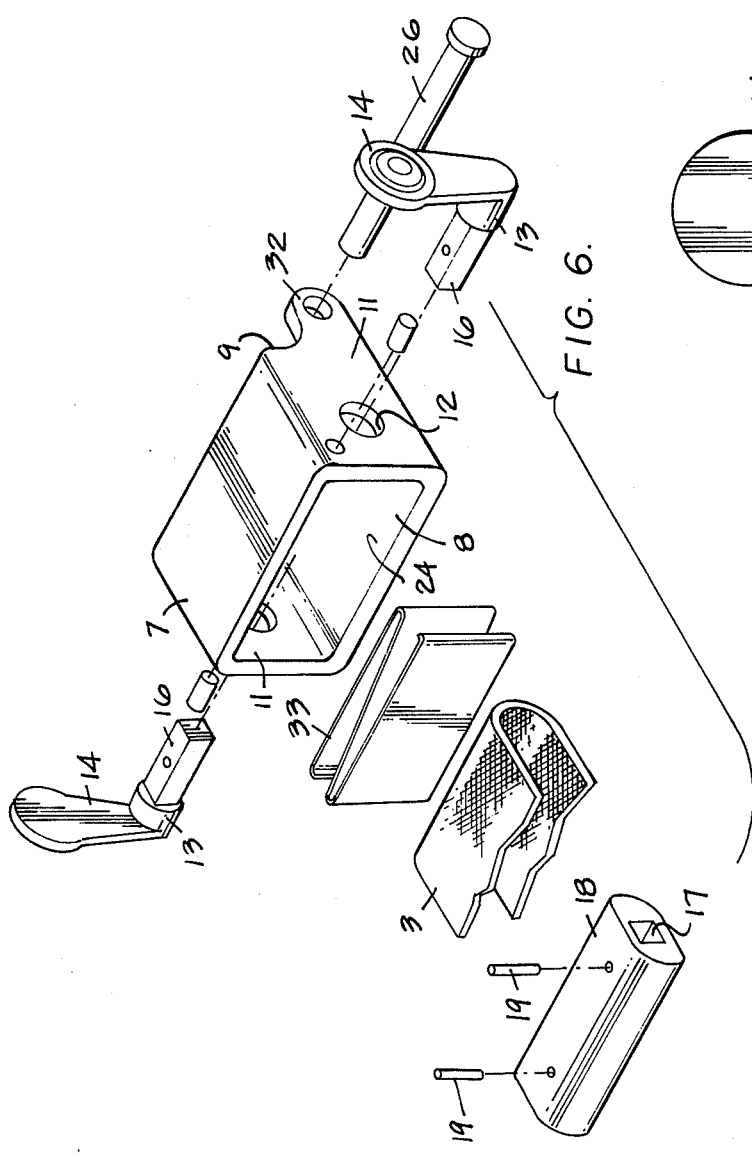

BOX WEBBING ADJUSTER

BACKGROUND OF THE INVENTION

Various types of box webbing adjusters are now used, but most of them require special holding teeth or knurls or rubber friction members, or superimposed friction surfaces and heavy springs to hold the webbing tightly between opposite gripping members.

It is the primary object of this invention to provide a box webbing adjuster with very few parts and without relatively movable gripping elements or superimposed relatively slidable frictional members thereby to eliminate the need for strong springs for pulling the gripping elements into gripping position, and wherein the gripping is accomplished by the tension on the webbing.

Another object of the invention is to provide a simple device with very few parts to adjustably anchor webbing which device can be easily and quickly operated, requires no adjustment, and which can be used with single or double take-up action and wherein the webbing rides on a smooth cam surface which latter is so dimensioned that the webbing is never held directly over the diagonal of the cam, hence cannot be jammed in dead center position.

BRIEF DESCRIPTION OF THE FIGURES

FIG. 1 is a plan view of the assembly of the releasable connections for a belt with the webbing adjuster interconnected between the webbing and each of the connector elements.

FIG. 2 is a side view of FIG. 1.

FIG. 6 is a developed view of a modified form the adjuster.

FIG. 7 is a sectional view of the modified form.

DETAILED DESCRIPTION

Figure 3:
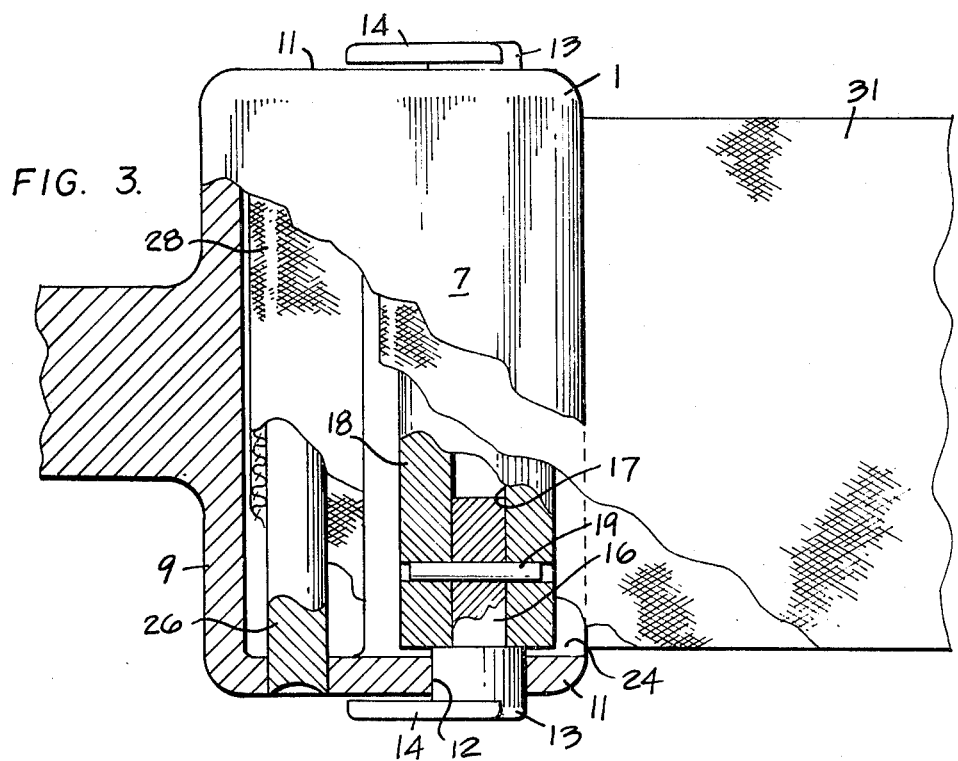
FIG. 3 is a cut-away top view of the adjuster.

As shown in FIG. 1 the box webbing adjuster 1 is interconnected between the male connector 2 and its webbing 3 and another adjuster is interconnected between the female connector 4 and its webbing 6.

The adjuster consists of a box which has a top wall 7, a bottom wall 8, an end wall 9 and sides 11. Each of the sides 11 has a hole 12 therethrough in which is journalled the hub 13 of a hand lever 14. From each hub 13 extends a stub shaft 16 into the central bore 17 of a drum cam 18 located inside the box and between the sidewalls 11. A pin 19 extending through the cam 18 and at each stub shaft 16 secures the latter to the cam so that the cam can be turned by manipulation of the lever 14.

The cam 18 is cross-sectionally a substantially diagonal cam, the opposite projections or apices 21, of which are spaced from one another at a diagonal distance substantially equal to or greater than the height of the box between the inner surfaces of the top wall 7 and the bottom wall 8, thereby to prevent rotation of the cam to dead center relatively to the axis of rotation. Each projection 21 is formed into a rounded apex. A smooth curved gripping surface 22 is at each projection 32 at one side and a flat cam surface 23 is at each projection 21 at the other side thereof. The flat surfaces 23 are substantially parallel. The curved gripping surfaces 22 are at such distance from the axis of rotation of the cam as to provide clearance at the respective walls 7 and 8 equal to or slightly less than the thickness of the webbing.

Figure 4:
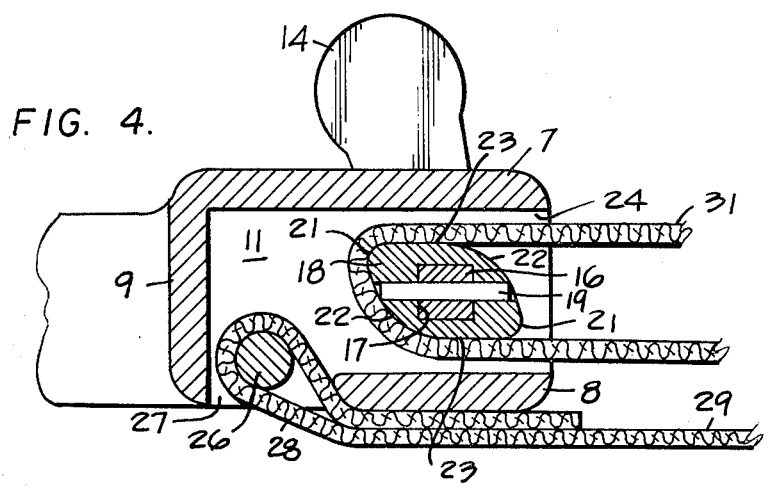
FIG. 4 is a cut-away side view showing the parts in unlocking position.
Figure 5:
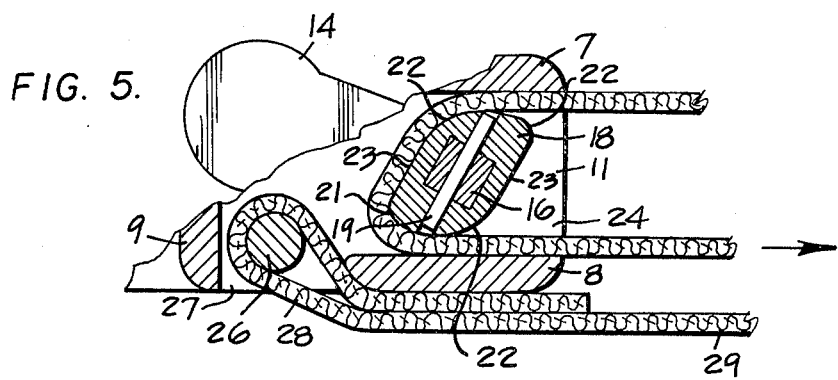
FIG. 5 is a cut-away side view showing the parts in locking position.

The opening 24 at the end of the box opposite the end wall 9 permits the passing of the webbing around the cam in the box so that both branches of the webbing are passed through the openings 24. As the lower branch of the webbing shown in FIG. 4 is pulled, it engages the heel projection of the cam and turns the cam into the position shown in FIG. 5. The harder the tension on the webbing, the tighter the curved surface 22 presses against the adjacent wall of the box, but at all times, the pressure on the curved surface is offset circumferencially to one side of the axis of rotation of the cam so that the cam wedges over the webbing, but cannot be turned to the degree where the projections or apices are in line with the center of rotation perpendicularly between the top and bottom walls 7 and 8 on dead center.

An anchor pin 26 adjacent the back wall 19 is spaced from and parallel with the cam. An opening 27 through the bottom wall 8 adjacent the anchor pin 26 allows the insertion and anchoring of a loop 28 on the end 29 of the webbing on the anchor pin 26. The webbing 30 is extended to the particular part to which the webbing is adjustably fastened. Then the webbing branch 30 is returned through the opening 24 into the box, around the cam 18 and out through the opening 24 to provide a tab 31. Pull exerted on either the tab 31 or the webbing branch 30 exerts the turning force on the cam 18 so as to firmly clamp the webbing in position. The more force exerted on the webbing, the firmer is the clamping or gripping action.

In order to let out the webbing, either lever 14 may be manipulated to turn the cam into the position shown in FIG. 4 and thereby to loosen the webbing. When the lever 14 is released, the pull on the webbing turns the cam into the locking position to firmly lock the webbing.

In the modified form shown in FIG. 6, the anchor pin 26 extends through ears 32 outside and beyond the back wall 9 of the box. In this form a light ribbon spring 33 is placed against the back wall 9 so as to bear against the webbing on the cam with light pressure thereby preventing creep of the webbing. The spring is so weak and its pressure is so small that it does not interfere with the aforementioned operation of the adjuster.

In both embodiments the smooth curved portion curves outwardly toward the adjacent projection so as to exert wedging force on the webbing under tension.

I claim:

1. A box webbing adjuster comprising, a box having a top wall, a bottom wall, opposite sides between said walls, and an opening at one end between the sides of the box for the passage of the webbing, a cam extending between said walls across the box parallel with said opening in position for passing the webbing around the cam and out through said opening, means to journal the cam in said sides of the box, manipulating means acessible from the outside of the box connected to said cam for manipulating the cam for rotation about an axis substantially parallel with the opening, the cross-sectional shape of said cam being such that said cam has diagonally opposite risers and the distance between the opposite risers of the cam is about the same or longer than the distance between the top and bottom walls of the box thereby to prevent the cam from assuming a dead center position in the box, a curved peripheral portion adjacent each riser being of such height as to leave a limited clearance adjacent said top and bottom walls for pressing the webbing against said walls thereby to lock the webbing in the box.

2. The box webbing adjuster specified in claim 1, and
an anchor element on said box to anchor an end of the webbing and said webbing being anchored on said element and passed around the cam in the box whereby tension on said webbing in either direction turns the cam into web locking position offset respectively to opposite sides relatively to the axis of the cam.

3. The box webbing adjuster specified in claim 2, and
a backwall on said box spaced from said cam, and
a spring bearing on said backwall and on the webbing on said cam.

4. The box webbing adjuster specified in claim 1, and said journalled means being journalled in said sides, and said handle means being on the journalled portions of said cam.

5. The box webbing adjuster specified in claim 4, and
said journal means including a stub shaft secured in each end of said cam and journalled in the respective sides, and
said handle means including a hand lever on each of said stub shafts.

6. The webbing adjuster specified in claim 4, and
a multiple leaf spring between said anchor element and said cam for holding said webbing against the cam surface.

* * * * *